US012439896B2

(12) United States Patent
Hayes, Jr. et al.

(10) Patent No.: US 12,439,896 B2
(45) Date of Patent: Oct. 14, 2025

(54) ROBOTIC SYSTEM AND METHOD FOR APPLICATION OF HEALTH-BASED PRODUCT

(71) Applicant: Bee Advantage LLC, Mansfield, OH (US)

(72) Inventors: Gerald William Hayes, Jr., Mansfield, OH (US); Hadley Arch, Stow, OH (US); Nathan Sterrett, Kent, OH (US)

(73) Assignee: Bee Advantage LLC, Mansfield, OH (US)

( * ) Notice: Subject to any disclaimer, the term of this patent is extended or adjusted under 35 U.S.C. 154(b) by 0 days.

(21) Appl. No.: 18/901,525

(22) Filed: Sep. 30, 2024

(65) Prior Publication Data

US 2025/0107511 A1 Apr. 3, 2025

Related U.S. Application Data

(60) Provisional application No. 63/586,457, filed on Sep. 29, 2023.

(51) Int. Cl.
*A01K 51/00* (2006.01)

(52) U.S. Cl.
CPC .................................... *A01K 51/00* (2013.01)

(58) Field of Classification Search
CPC ...................................................... A01K 51/00
See application file for complete search history.

(56) References Cited

U.S. PATENT DOCUMENTS 4,387,474 A * 6/1983 Schierloh ............... A01K 51/00
604/289
7,922,559 B2 4/2011 Cook
(Continued)

FOREIGN PATENT DOCUMENTS

BR 112014004438 B1 3/2020
KR 20190031391 A 3/2019
KR 102133803 B1 * 7/2020 ............ A01K 55/00
WO 2024151973 A1 7/2024

OTHER PUBLICATIONS

Bechar, Avital, et al., "Agricultural robots for field operations: Concepts and components", Biosystems Engineering vol. 149, Sep. 2016, pp. 94-111, https://doi.org/10.1016/j.biosystemseng.2016.06.014, Elsevier.

Sheikh, Knuval, "A Growing Presence on the Farm: Robots", Article: The New York Times, Feb. 13, 2020, https://www.nytimes.com/2020/02/13/science/farm-agriculture-robots.html.

(Continued)

*Primary Examiner* — Magdalena Topolski

(74) *Attorney, Agent, or Firm* — Jacob M. Ward; Ward Law Office LLC

(57) ABSTRACT

A robotic system for delivery of a health-based product to a beehive may include a movable frame and a product tank configured to hold the health-based product, a navigation system configured to detect the location of the beehive for delivering the health-based product, an applicator in fluid communication with the product tank, a boom that may be configured to extend and retract relative to the movable frame, a fogger assembly configured to prepare and deliver the health-based product to the beehive through an entrance of the beehive. A controller in communication with the movable frame, navigation system, boom, fogger assembly, and applicator, may be configured to position the movable frame adjacent the beehive, extend the boom to dispose the applicator through the beehive entrance, activate the fogger assembly, and deliver the health-based product from the fogger assembly through the beehive entrance when the applicator is disposed through the beehive entrance.

20 Claims, 13 Drawing Sheets

(56) References Cited

U.S. PATENT DOCUMENTS

| | | | | |
|---|---|---|---|---|
| 10,595,523 | B2 * | 3/2020 | Martens | A01K 51/00 |
| 10,757,921 | B1 * | 9/2020 | Wood | A01K 51/00 |
| 10,779,472 | B2 | 9/2020 | Robertson et al. | |
| 11,596,131 | B1 * | 3/2023 | Johnson | H05B 1/0297 |
| 11,723,366 | B2 | 8/2023 | Hannus et al. | |
| 2004/0219863 | A1 | 11/2004 | Willacy | |
| 2014/0212520 | A1 | 7/2014 | Del Vecchio | |
| 2018/0160656 | A1 | 6/2018 | Ben-Shimon et al. | |
| 2020/0120886 | A1 * | 4/2020 | Geltner | B25J 9/1697 |
| 2021/0275566 | A1 | 9/2021 | Paldi et al. | |
| 2021/0400926 | A1 * | 12/2021 | Chatterjee | A01K 51/00 |
| 2022/0295760 | A1 | 9/2022 | Radzyner | |
| 2024/0000086 | A1 | 1/2024 | Grose et al. | |
| 2024/0237622 | A1 | 7/2024 | Hayes | |

OTHER PUBLICATIONS

List, Jenny, “A New Open-Source Farming Robot Takes Shape”, Blog: hackaday.com, Mar. 5, 2021, https://hackaday.com/2021/03/05/a-new-open-source-farming-robot-takes-shape/.

Alexander, Taylor, “Introducing Acorn, a precision farming rover from Twisted Fields”, Research Blog: community. twistedfields.com, Feb. 2021, https://community.twistedfields.com/t/introducing-acorn-a-precision-farming-rover-from-twisted-fields/17.

Melgares, Pat, “Automation in the field: Robots, drones are becoming agriculture’s modern-day workhorses”, Research Magazine, Kansas State University, https://www.k-state.edu/seek/fall-2019/robots-drones-becoming-tools-inagriculture/index.html.

Written Opinion of the International Searching Authority dated May 21, 2024.

* cited by examiner

ROBOTIC SYSTEM AND METHOD FOR APPLICATION OF HEALTH-BASED PRODUCT

CROSS-REFERENCE TO RELATED APPLICATIONS

This application claims the benefit of U.S. Provisional Application No. 63/586,457, filed on Sep. 29, 2023. The entire disclosure of the above application is incorporated herein by reference.

FIELD

The present technology includes articles of manufacture and processes that relate to robotic systems and methods for application of a health-based product to managed beehive colonies, including related devices, systems, and methods.

INTRODUCTION

This section provides background information related to the present disclosure which is not necessarily prior art.

More food is needed for our growing world. As farms expand, they contribute to climate change through the increased use of land, water, chemical treatments, and agricultural machinery, which can negatively affect crop production itself in a downward cycle. To end this cycle, advancements to minimize crop loss and maximize production are needed. A key advancement in the United States (U.S.) has been the use of the Western Honeybee (*Apis mellifera*) for increased pollination, contributing billions of dollars to the value of U.S. crop production alone and greater than 9% to crop production across the world. The western honeybee plays a critical role in U.S. agriculture by providing essential pollination services. Approximately one third of global food production relies on animal pollinators, with honeybees being the primary species used in commercial agriculture. In the U.S., honeybees contribute to the production of several crops, including almonds, apples, blueberries, cherries, and cucumbers. Without honeybees, many of these crops would suffer from reduced yields, leading to higher prices and limited availability. To keep up with large-scale agricultural efforts, there are approximately 2.7 million managed colonies of honeybees in the U.S. alone. As such, the Western Honeybee is integral not only to food security but also to the stability of the agricultural economy.

Despite their importance, honeybees have faced severe population declines in recent years, primarily due to pests, diseases, and other environmental stressors. One of the most significant threats is the Varroa mite (Varroa destructor), a parasitic mite that weakens honeybees by feeding on their fat stores and transmitting deadly viruses. Varroa mites are particularly dangerous because they spread rapidly and are difficult to eradicate, causing widespread colony collapse. In the past 15 years, dramatic honeybee losses during overwintering have been reported worldwide, including in the U.S. and in Europe, threatening crop production. The combination of these pests, along with other factors, has led to significant annual losses of honeybee colonies. Beekeepers in the U.S. have reported losing a significant population of their colonies each year, far exceeding what is considered sustainable. These losses threaten the agricultural sector and food production, as fewer healthy colonies mean reduced pollination services for crops. Consequently, there is a growing urgency to develop commercial strategies for protecting honeybee populations from these threats.

Commercial beekeeping is essential to producing a wide range of economically important crops, where large-scale die-offs of managed hives due to parasites, pesticide use, and climate change pose major challenges for the industry. Parasite control is an effective way to reduce the pressure on bee colonies, and large beekeeping operations require the ability to quickly and efficiently deploy treatments in a cost-effective manner. Parasite controls may include phage-based pesticides that disrupt harmful pests such as 0 mites but leave honeybees unharmed.

In a commercial setting, beehives are often kept in large groups, making it difficult to deliver treatment all the beehives manually, by hand. Manual treatment is time consuming and inefficient. Manual delivery may also be disruptive to beehives and to humans who are in contact with the beehives, and manual delivery can involve extended human contact with pesticides. The entrance to a beehive is often located on the underside of the beehive, making it even more difficult to manually deliver the necessary treatment to beehives.

Despite the drawbacks of manual treatment for honeybee colonies, the various approaches developed for the application of beehive treatments to beehives typically involve manual labor and lack automation. These approaches result in inefficiencies and limitations in terms of accuracy and consistency. Manual application of beehive treatments to beehives may require significant time and effort, as well as the risk of disturbing the bees and potentially causing harm to the bees or the beekeeper. Additionally, manual application may result in inconsistent coverage and dosage of the beehive treatment, leading to suboptimal results. For example, each colony may be enclosed in a series of boxes to protect them from the environment and animal attack. This requires each managed honeybee colony to be opened individually by a trained beekeeper owner or employee. Once opened, one or more approved and labelled honeybee health-based products may be delivered to that individual colony.

One approach includes the use of handheld sprayers or applicators to manually apply the beehive treatment to the beehive. This approach requires the beekeeper to physically approach each beehive and manually spray or apply the product, which may be time-consuming and labor-intensive. Furthermore, the accuracy and consistency of the application may vary depending on the skill and technique of the beekeeper, leading to inconsistent results.

Another approach involves using fixed or stationary systems for the application of beehive treatments to beehives. These systems typically consist of a fixed structure or platform with a reservoir of the beehive treatment and an applicator mechanism. However, these fixed systems lack the flexibility and adaptability to effectively reach and apply the product to different beehives in various locations. The fixed nature of these systems may result in a limited ability to accommodate different hive configurations and may require the beekeeper to manually position the beehive in close proximity to the system.

While the use of autonomous systems in the agriculture sector has increased over the last ten years to increase productivity while maintaining low operating costs, this automation has not reached the commercial beekeeping industry. Currently, health-based products may be delivered to a honeybee colony by manually opening the colony and applying a health-based product to each colony individually, as discussed above. However, such an approach may be unduly time consuming, require physical effort, and training.

These disadvantages have cascading effects on the beekeeping industry, delaying coordination between commercial beekeepers and farmers.

Accordingly, there is a need for a way to effectively deliver health products to a honeybee colony that reduces time, effort, and requires little training.

SUMMARY

In concordance with the instant disclosure, a way to effectively deliver a health product to a honeybee colony that reduces time, effort, and requires little training, has been surprisingly discovered.

The present technology provides articles of manufacture, systems, and processes that relate to using focused robotic technology in the application of a health-based product to managed beehive colonies to thereby minimize the time, physical effort, training, and cost associated with labor management while meeting product application and delivery requirements. In certain embodiments, the system may include an automated application of a beehive treatment, such as described in U.S. patent application Ser. No. 18/411,865, titled AUTOMATED SYSTEM AND METHOD FOR APPLICATION OF A BEEHIVE TREATMENT, which is incorporated herein by reference. The health-based product may include one or more of a honeybee pest product, a honeybee predator control product, a honeybee parasite control product, a honeybee disease control product, and combinations thereof. The health-based product may include a phage-based pesticide. In particular, the phage-based pesticide may include a phage-based pesticide such as described in U.S. patent application Ser. No. 18/040,742, titled PHAGE-BASED PESTICIDE AGAINST VARROA DESTRUCTOR, which is incorporated herein by reference.

In certain embodiments, a robotic system for delivery of a health-based product to a beehive entrance may include a movable frame. A navigation system may be disposed on the movable frame and configured to determine the location of the beehive entrance. A product tank may be disposed on the movable frame, where the product tank may be configured to contain a health-based product. A boom may be disposed on the movable frame and configured to extend and retract relative to the movable frame. An applicator may be coupled to the boom, where the applicator may include a dispensing end. The applicator may be configured to be in fluid communication with the product tank. A controller may be in communication with the movable frame, the navigation system, the boom, and the applicator. The controller may be configured to position the movable frame adjacent the beehive entrance. The controller may also be configured to extend the boom to dispose the dispensing end of the applicator through the beehive entrance. The controller may be configured to deliver the health-based product through the beehive entrance when the applicator is disposed through the beehive entrance. The controller may be configured to retract the boom to withdraw the applicator from the beehive entrance.

In certain embodiments, a robotic system for delivery of a health-based product to a beehive entrance may include a movable frame, a navigation system disposed on the movable frame and configured to determine the location of the beehive entrance, and a product tank disposed on a movable frame, the product tank configured to contain a health-based product. An applicator may be provided, where the applicator may include a dispensing end. The applicator may be configured to be in fluid communication with the product tank. A fogger assembly may be disposed on the movable frame and configured to be in fluid communication with the product tank and the applicator. A controller may in communication with the movable frame, the navigation system, the applicator, and the fogger assembly. The controller may be configured to position the movable frame adjacent the beehive entrance. The controller may also be configured to dispose the applicator to the beehive entrance and may be further configured to dispose the dispensing end of the applicator through the beehive entrance. The controller may be configured to activate the fogger assembly, and the controller may be configured to deliver the health-based product from the fogger assembly through the beehive entrance when the applicator is disposed through the beehive entrance.

In certain embodiments, a robotic system for delivery of a health-based product to a beehive entrance may include a movable frame, a navigation system disposed on the movable frame and configured to determine the location of the beehive entrance, and a product tank disposed on a movable frame, where the product tank is configured to contain a health-based product, a boom disposed on the movable frame, configured to extend and retract relative to the movable frame, and a fogger assembly disposed on the movable frame, the fogger assembly configured to be in fluid communication with the product tank. The robotic system may include an applicator having a dispensing end. The applicator may be configured to be in fluid communication with the product tank. A nozzle may be coupled to the dispensing end of the applicator. The robotic system may include a turret coupled to the movable frame and rotatably coupled to the boom. An arm may be coupled to the boom and may be coupled to the applicator. The robotic system may include a wrist coupled to the arm and coupled to the applicator. The robotic system may also include a pump in fluid communication with a fluid supply line, the fogger assembly, and the applicator. A controller may be provided that is in communication with the movable frame, the navigation system, the fogger assembly, the applicator, the turret, the boom, and the pump. The controller may be configured to extend the boom to dispose the dispensing end of the applicator through the beehive entrance. The controller may be configured to activate the fogger assembly, and the controller may be configured to deliver the health-based product from the fogger assembly through the beehive entrance when the applicator is disposed through the beehive entrance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 3A:
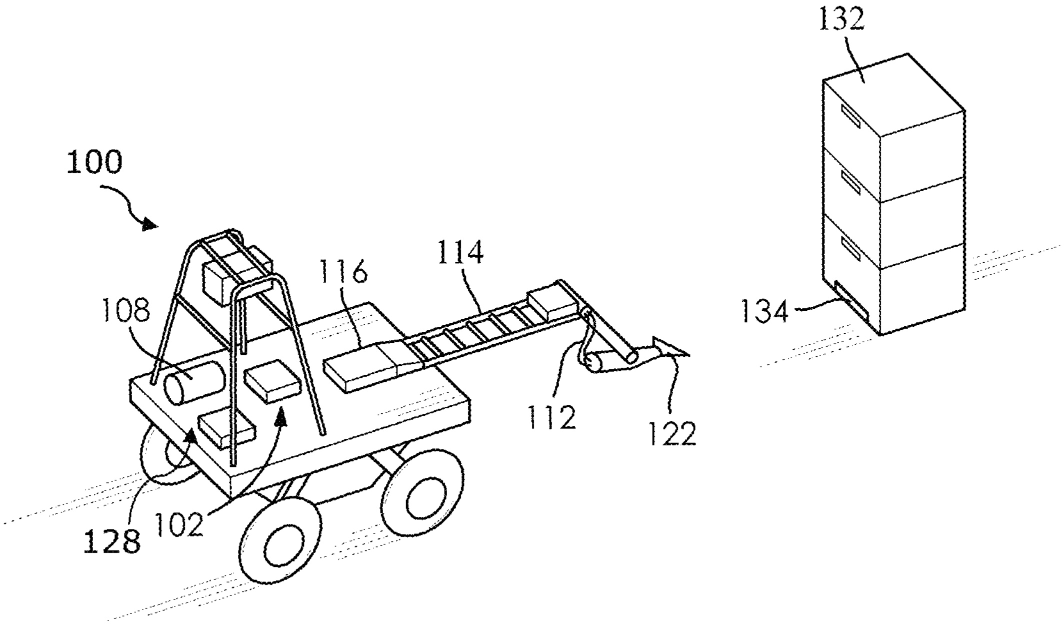

FIG. 3*a* illustrates a robotic system for delivery of a health-based product to a beehive approaching a beehive, according to an embodiment of the present disclosure.

Figure 3B:
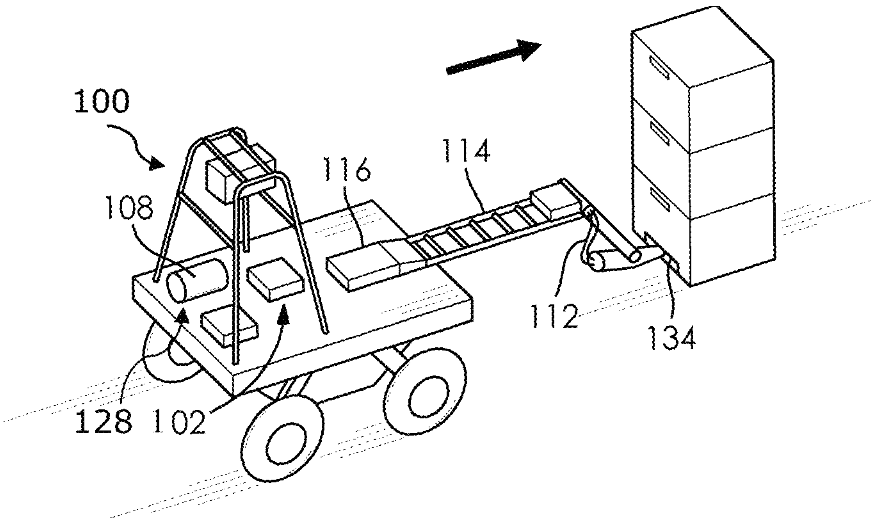

FIG. 3*b* is a drawing illustrating a robotic system for delivery of a health-based product to a beehive deploying a boom, according to an embodiment of the present disclosure.

Figure 4A:
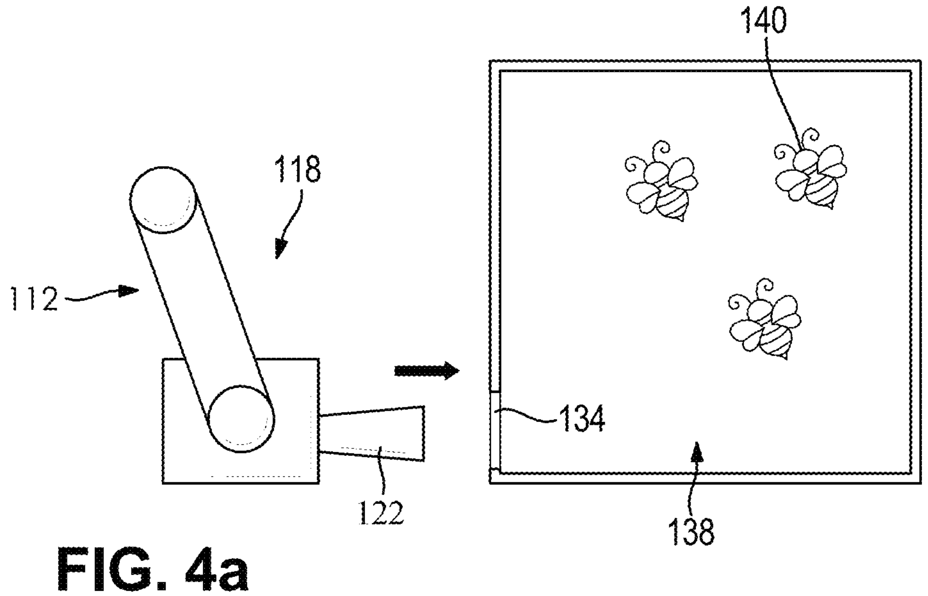

FIG. 4*a* illustrates an applicator for a robotic system for delivery of a health-based product to a beehive entrance, according to an embodiment of the present disclosure.

Figure 4B:
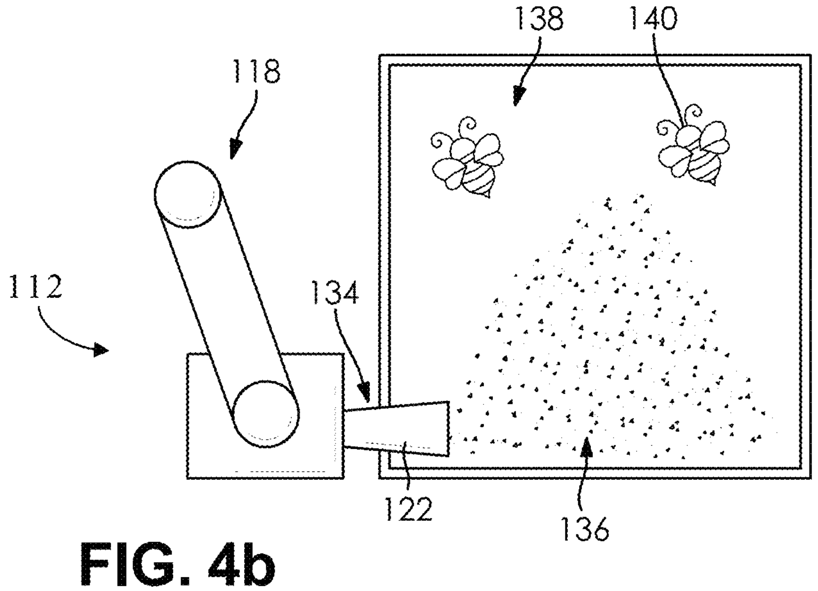

FIG. 4*b* illustrates an applicator for a robotic system for delivery of a health-based product to a beehive delivering the health-based product to the interior of the beehive, according to an embodiment of the present disclosure.

Figure 5:
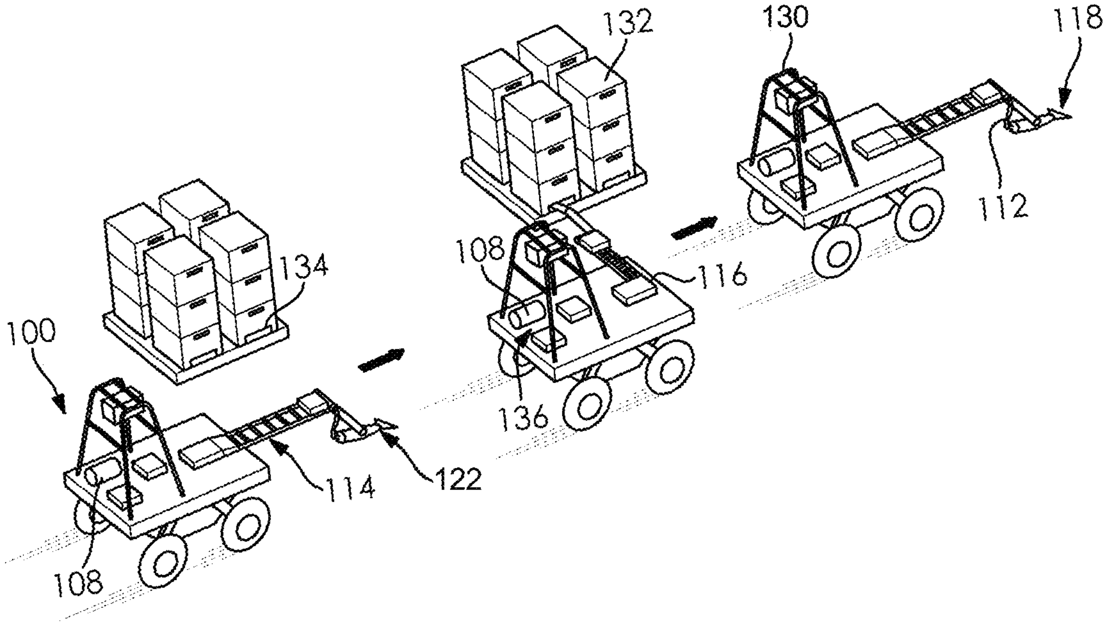

FIG. 5 illustrates a robotic system for delivery of a health-based product to multiple beehives, according to an embodiment of the present disclosure.

Figure 6:
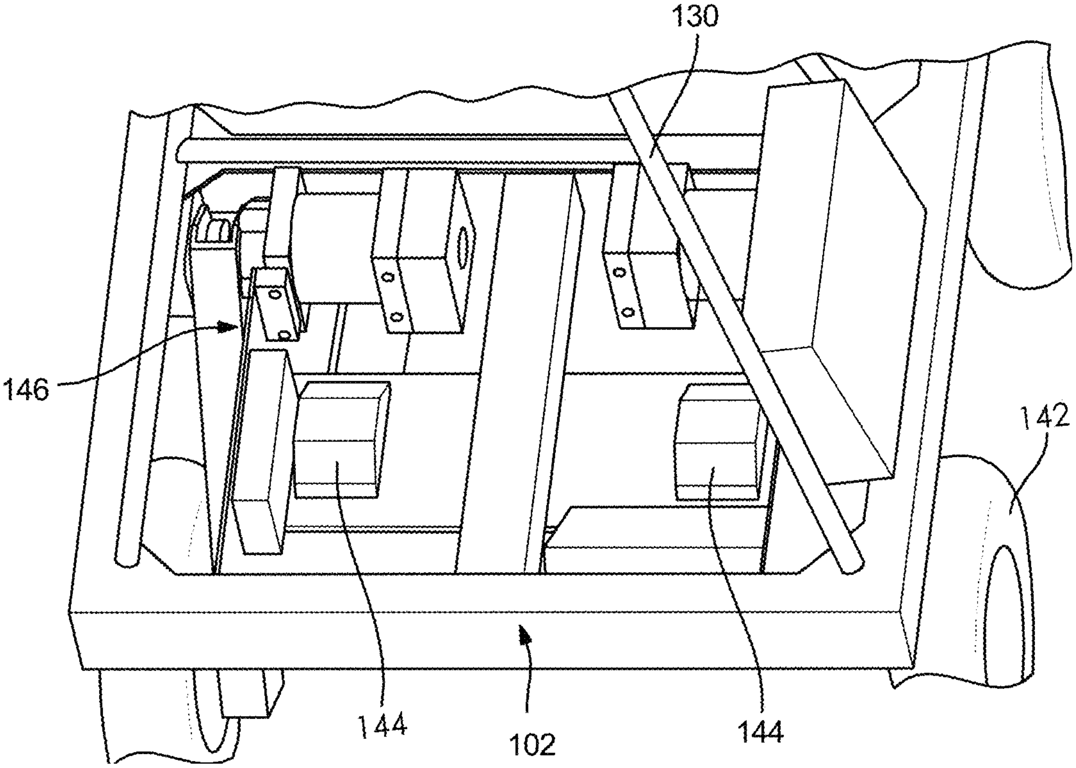

FIG. 6 is a partial cutaway view of a movable frame for a robotic system for delivery of a health-based product to a beehive, according to an embodiment of the present disclosure.

Figure 7:
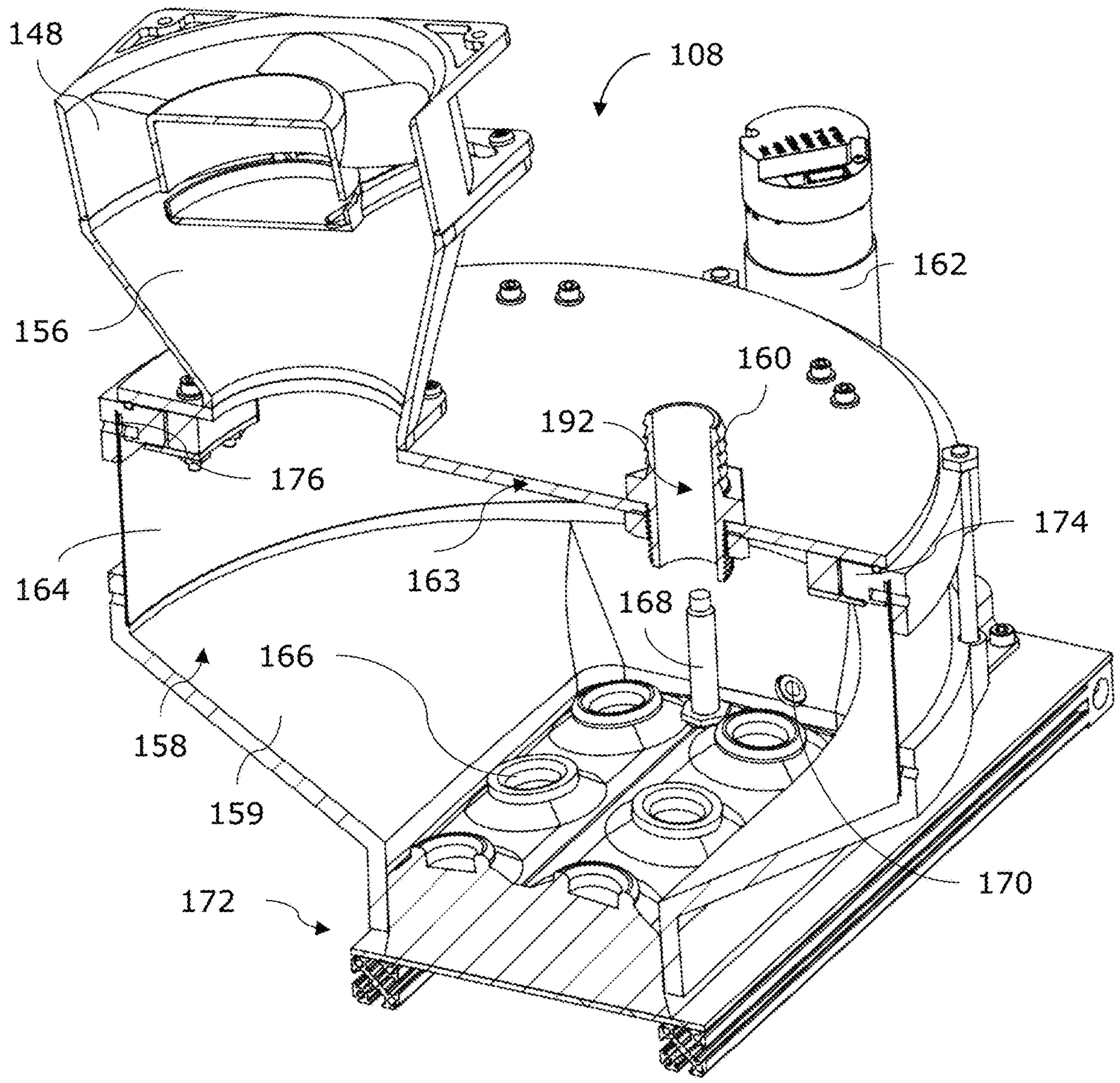

FIG. 7 is a cutaway view of a fogger assembly for a robotic system for delivery of a health-based product to a beehive, according to an embodiment of the present disclosure.

Figure 8:
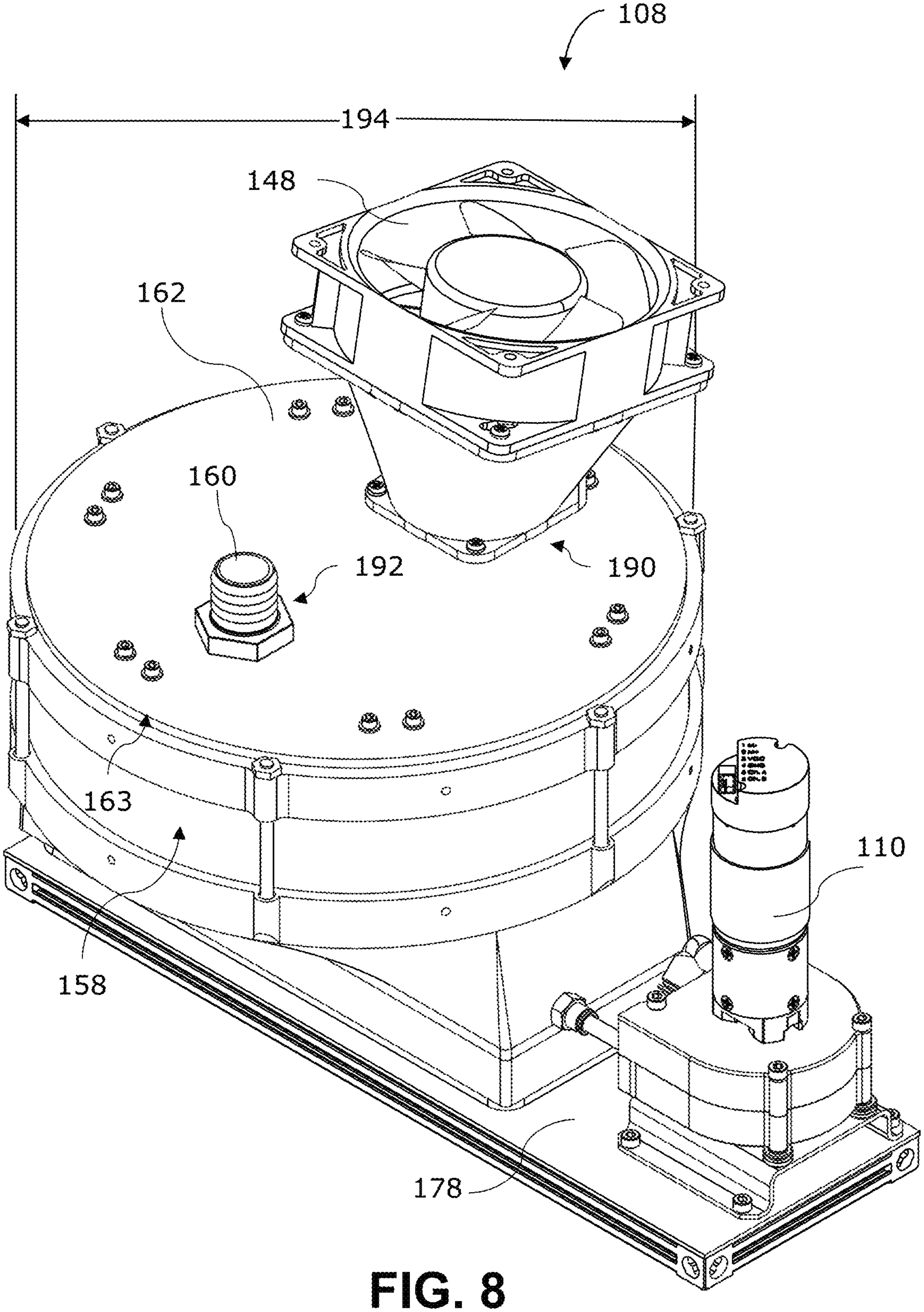

FIG. 8 is a top perspective view of a fogger assembly, according to an embodiment of the present disclosure.

Figure 9A:
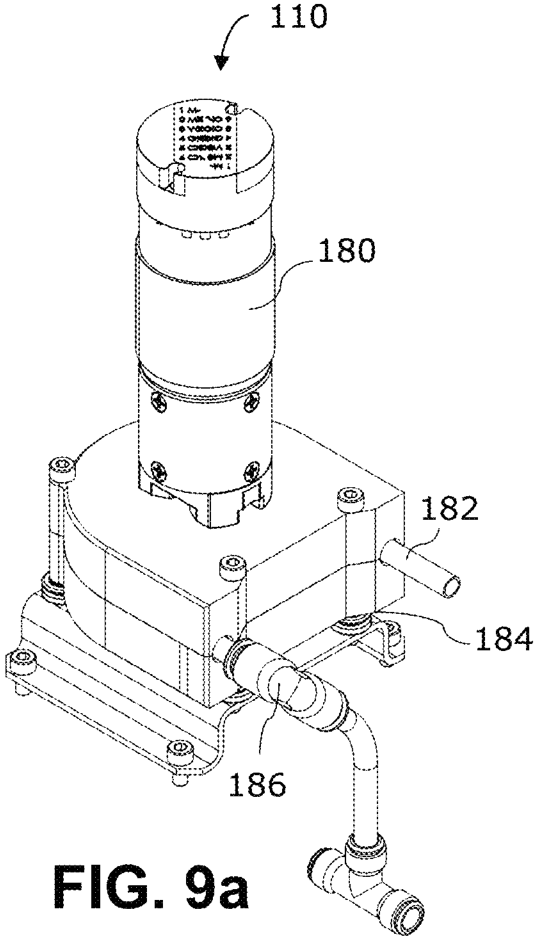

FIG. 9*a* is a top perspective view of a pump for a fogger assembly, according to an embodiment of the present disclosure.

Figure 9B:
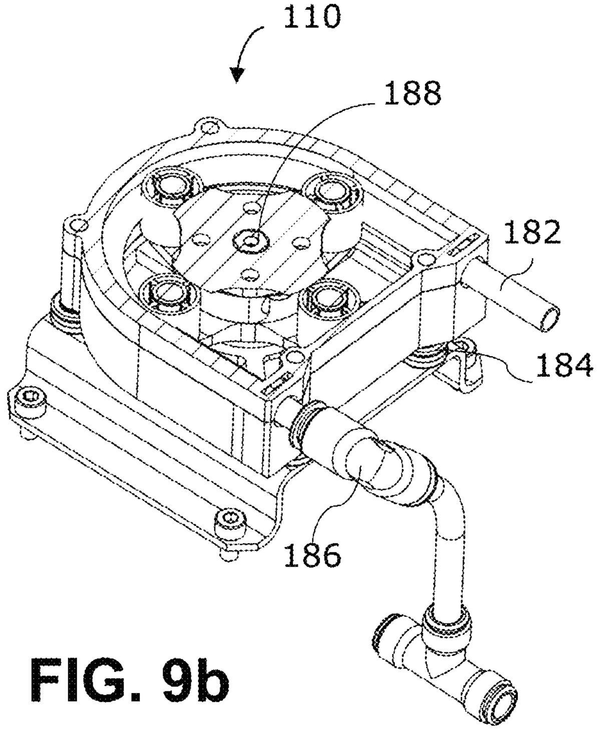

FIG. 9*b* is a cutaway view of a pump for a fogger assembly, according to an embodiment of the present disclosure.

Figure 10A:
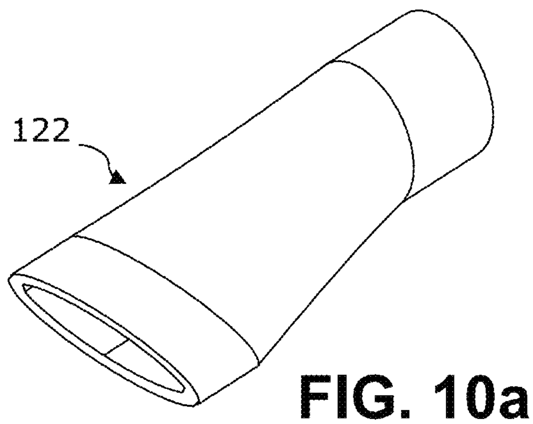

FIG. 10*a* is a perspective view of a nozzle, according to an embodiment of the present disclosure.

Figure 10B:
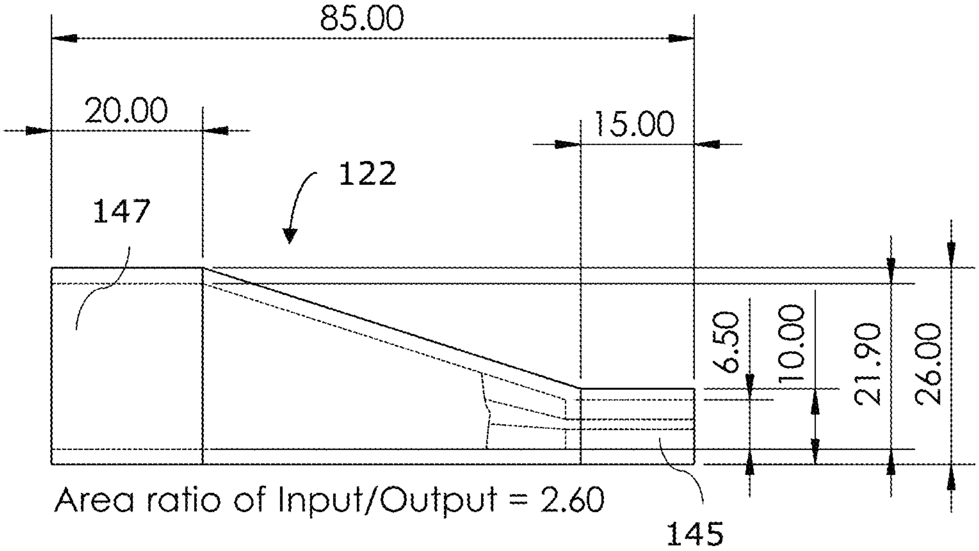

FIG. 10*b* is a cross-sectional view of a nozzle, according to an embodiment of the present disclosure.

Figure 10C:
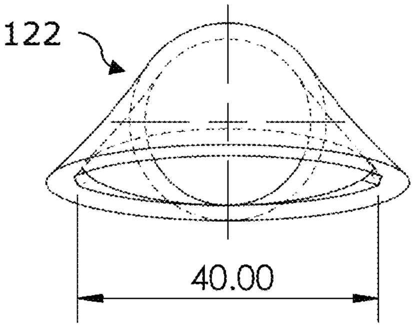

FIG. 10*c* is a front perspective view of a nozzle, according to an embodiment of the present disclosure.

Figure 11A:
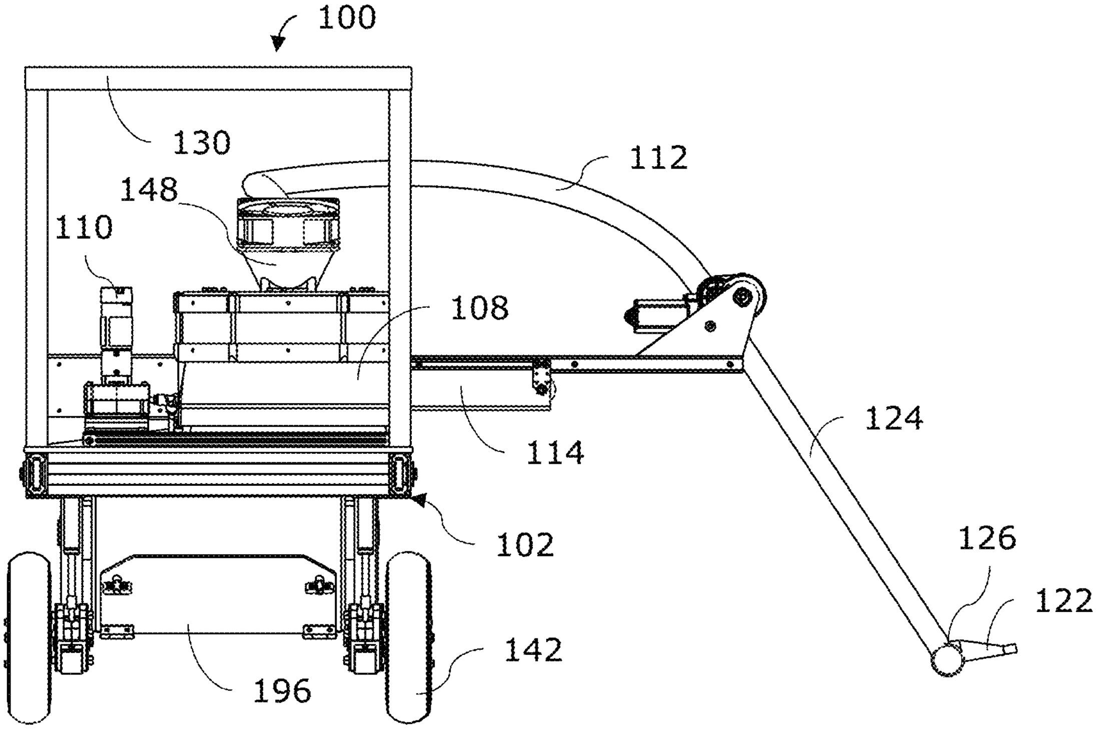

FIG. 11*a* is a rear elevational view of a robotic system for delivery of a health-based product to a beehive, according to an embodiment of the present disclosure.

Figure 11B:
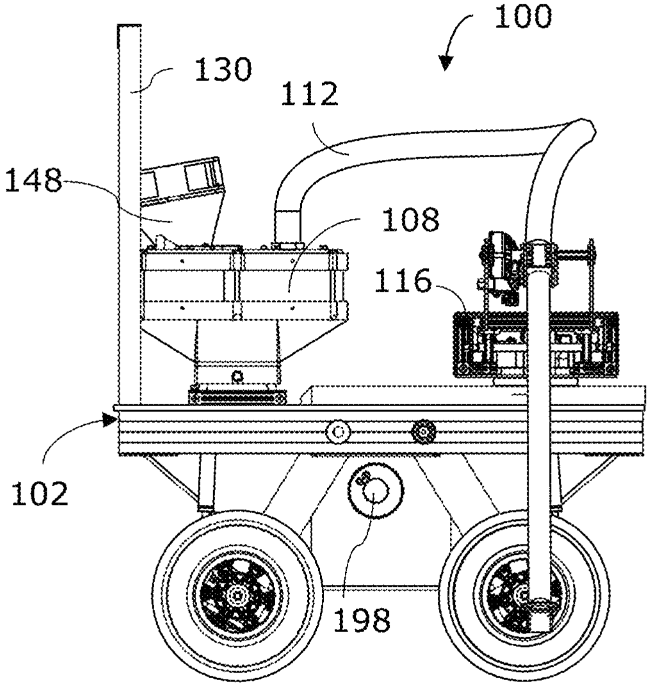

FIG. 11*b* is a side elevational view of a robotic system for delivery of a health-based product to a beehive, according to an embodiment of the present disclosure.

Figure 12A:
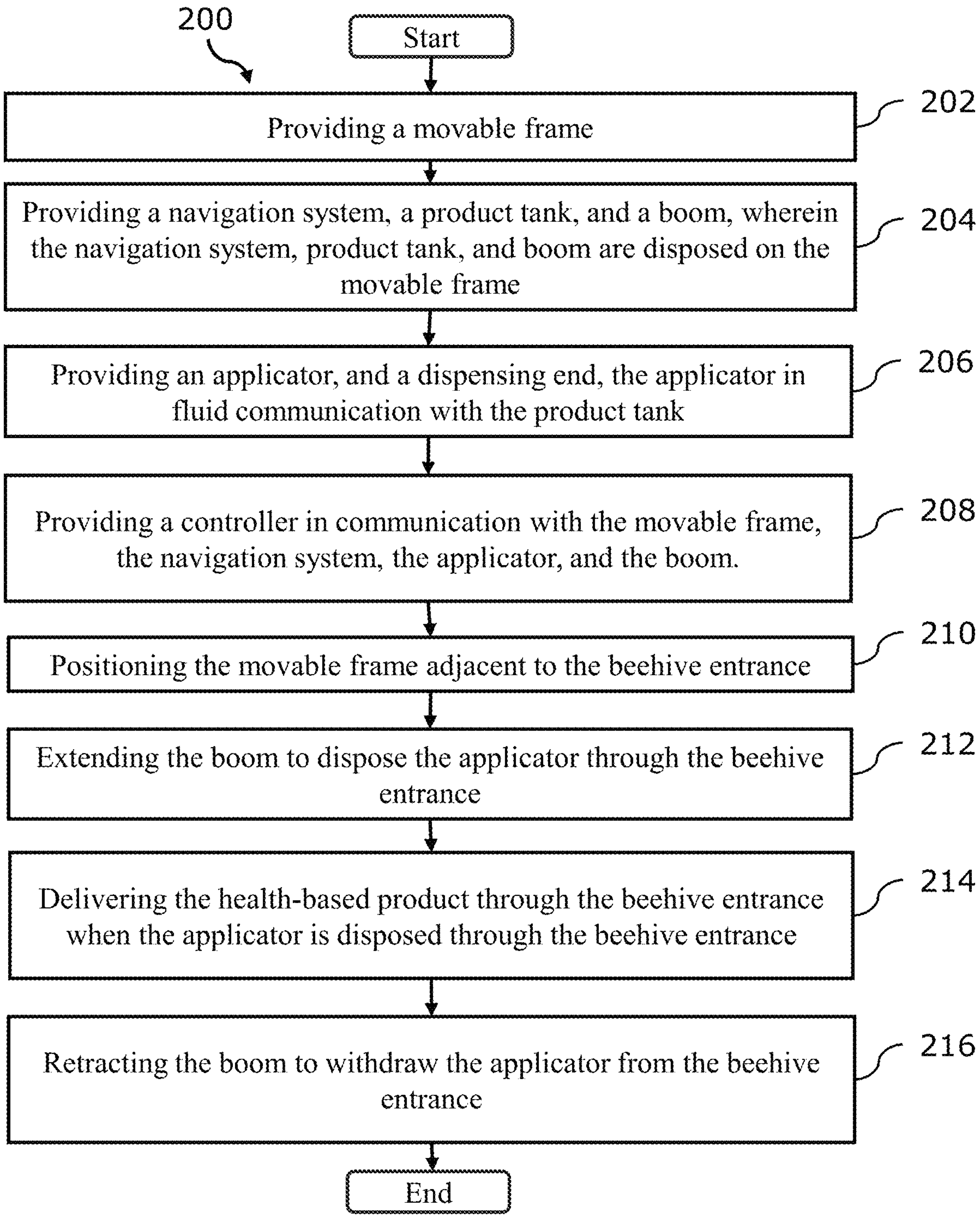

FIG. 12*a* is a flowchart illustrating a method of using a robotic system for delivery of a health-based product to a beehive using a boom, according to an embodiment of the present disclosure.

Figure 12B:
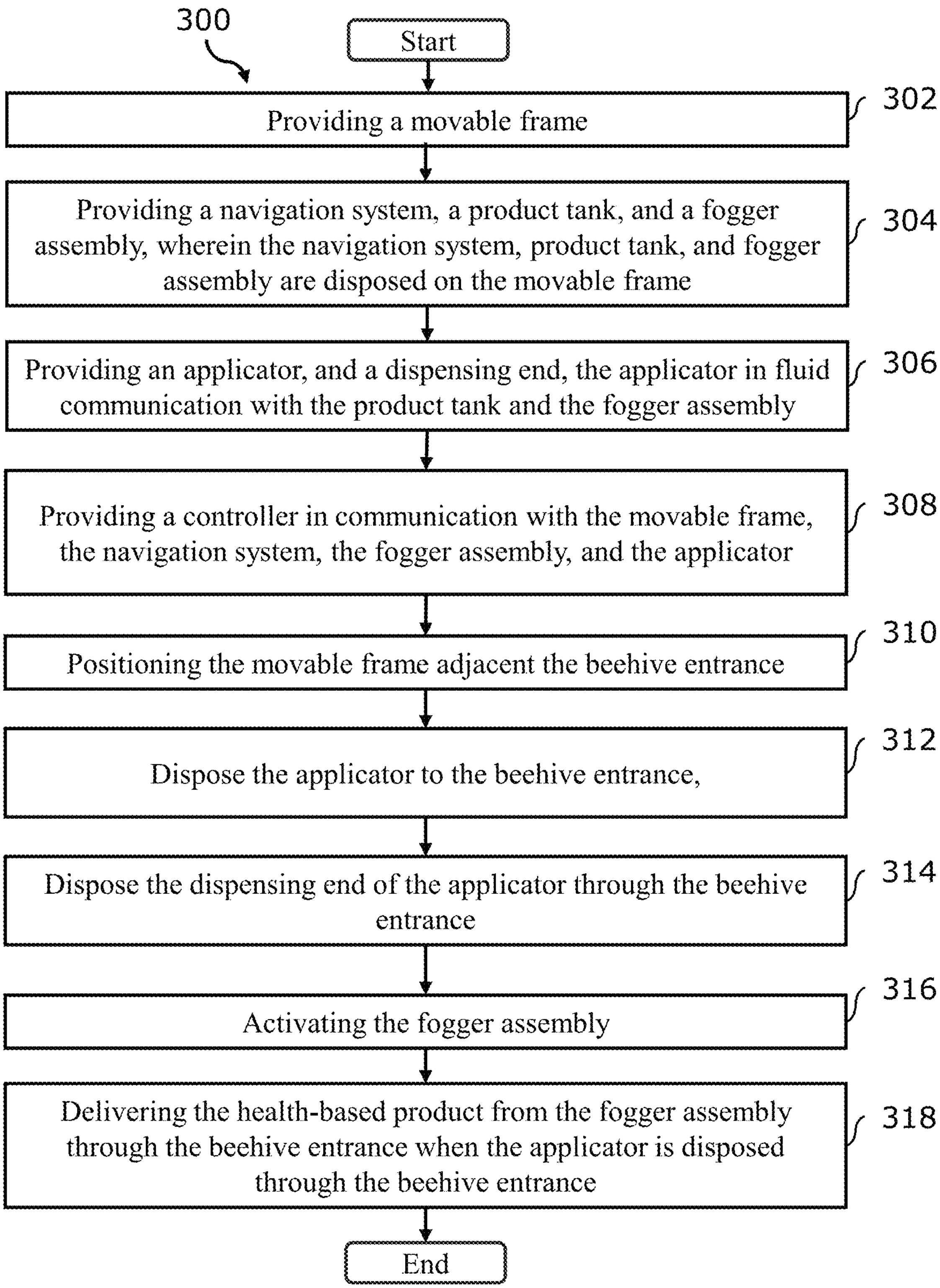

FIG. 12*b* is a flowchart illustrating a method of using a robotic system for delivery of a health-based product to a beehive using a fogger, according to an embodiment of the present disclosure.

Figure 12C:
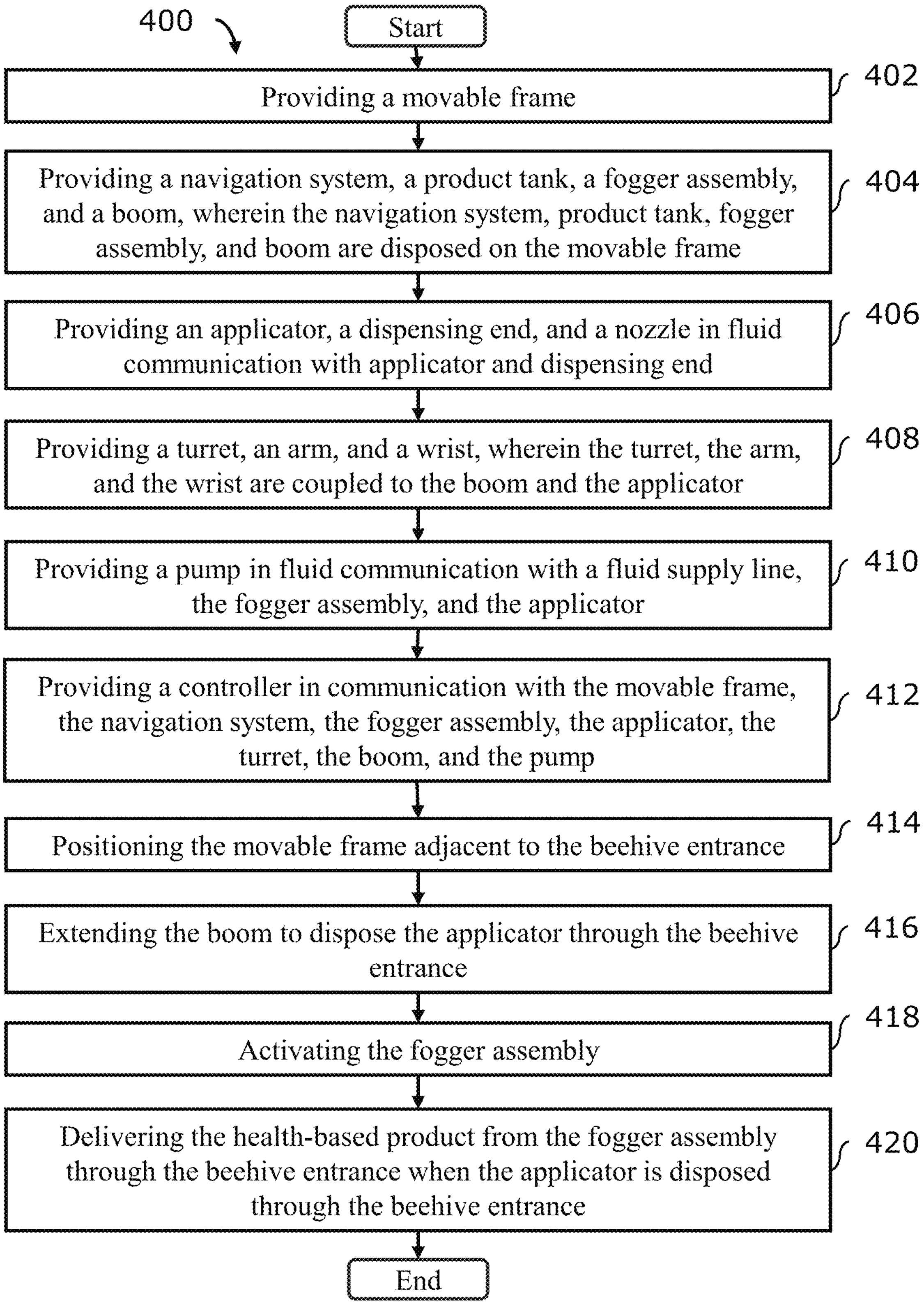

FIG. 12*c* is a flowchart illustrating a method of using a robotic system for delivery of a health-based product to a beehive using a boom and a fogger, according to an embodiment of the present disclosure.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps may be different in various embodiments, including where certain steps may be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides articles of manufacture, systems, and processes that relate to using focused robotic technology in the application of a health-based product to managed beehive colonies to thereby minimize the time, physical effort, training, and cost associated with human management while meeting product application and delivery requirements. The robot may deliver one or more health-based products to one or more managed honeybee colonies in order to treat one or more honeybee pests, predators, parasites, and diseases. The use of the robotic system optimizes efficiency in managing honeybee health for the vital industry of managing honeybees and honeybee colonies.

Example embodiments of the present technology are provided with reference to the figures enclosed herewith.

Figure 1:
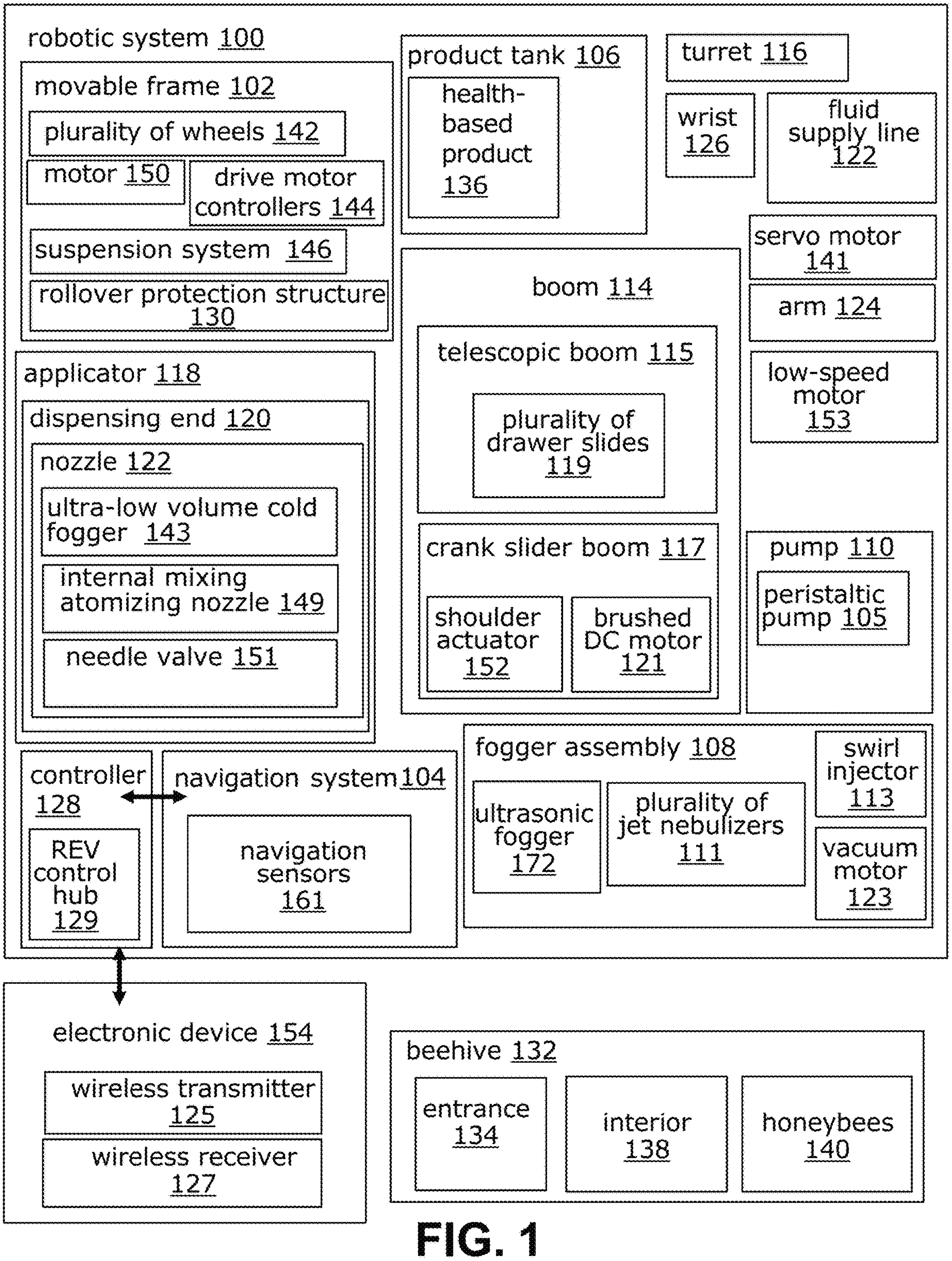
FIG. 1 is a block diagram illustrating a robotic system for delivery of a health-based product to a beehive, according to an embodiment of the present disclosure.
Figure 2:
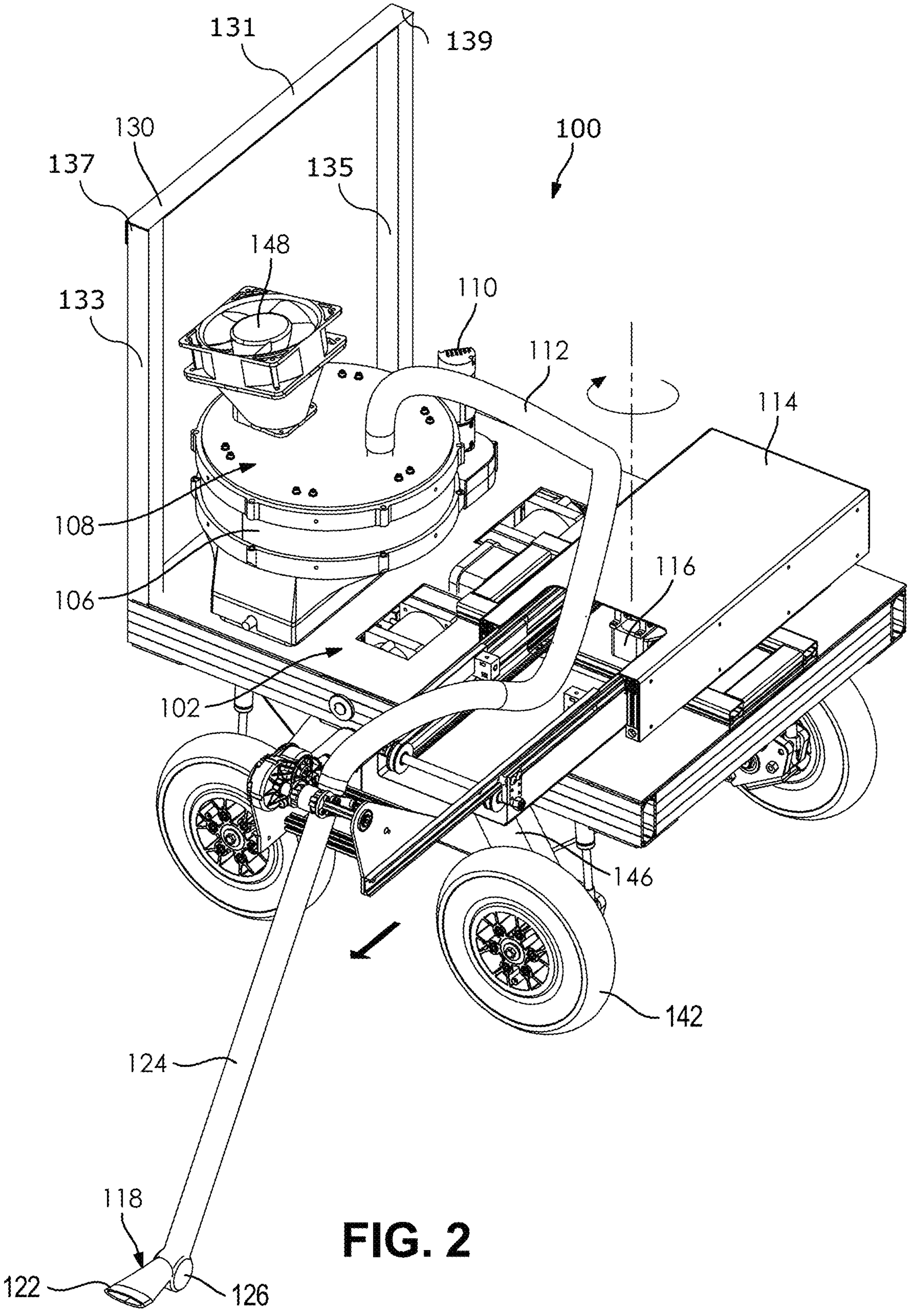
FIG. 2 is a top perspective view of a robotic system for delivery of a health-based product to a beehive, according to an embodiment of the present disclosure.

The present technology relates to a robotic system 100 and methods for the application of a health-based product 136 to managed beehive colonies, aspects of which are shown generally in FIGS. 1-12*c*. As shown in FIGS. 1-2, the robotic system 100 may include a movable frame 102, a navigation system 104, a product tank 106, a fogger assembly 108, a pump 110, a fluid supply line 112, a boom 114, a turret 116, an applicator 118, a dispensing end 120, a nozzle 122, an arm 124, a wrist 126, and a controller 128.

The navigation system 104 may include the following aspects. The navigation system 104 may be disposed on the movable frame 102. The navigation system 104 may be configured to detect a location of a beehive 132.

The robot system 100 may employ the following aspects in applying the health-based product 136 to a beehive 132. The product tank 106 may be disposed on the movable frame 102, where the product tank 106 may be configured to hold the health-based product 136. The fogger assembly 108 may be disposed on the movable frame 102 and in fluid communication with the product tank 106. The boom 114 may be disposed on the movable frame 102, where the boom 114 may be configured to extend and retract relative to the movable frame 102. The applicator 118 may be coupled to the boom 114, where the applicator 118 may be in fluid communication with the product tank 106 to apply the health-based product 136 to the beehive 132.

The applicator 118 may include the following aspects. The applicator 118 may further include a dispensing end 120. The nozzle 122 may be coupled to the dispensing end 120 of the applicator 118 and the nozzle 122 may be in fluid communication with the applicator 118. The turret 116 may be coupled to the movable frame 102 and rotatably coupled to the boom 114. The arm 124 may be rotatably coupled to the boom 114 and may be coupled to the applicator 118. The wrist 126 may be coupled to the arm 124 and may be coupled to the applicator 118. The pump 110 may be in fluid communication with a fluid supply line 112.

The controller 128 may include the following aspects. The controller 128 may be configured to control the operation of the pump 110 to deliver the health-based product 136 via the fluid supply line 112 to the applicator 118. In operation, the controller 128 may be in communication with the movable frame 102, the navigation system 104, the applicator 118, the turret 116, the boom 114, and the pump 110. With reference to FIGS. 1 and 3*a*-3*b*, the controller 128 may be configured to position the movable frame 102 adjacent the beehive 132. The controller 128 may further be configured to move the turret 116 to position the boom 114 in order to dispose the nozzle 122 to the entrance 134 of the beehive 132. The controller 128 may be further configured to extend the boom 114 to dispose the dispensing end 120 of the applicator 118 to the entrance 134 of the beehive 132.

With reference to FIGS. 1 and 4*a*-4*b*, the controller 128 may be further configured to place the nozzle 122 fully within the interior 138 of the beehive 132 through the entrance 134 of the beehive 132. The controller 128 may also be configured to activate the fogger assembly 108. The controller 128 may also be configured to deliver the health-based product 136 through the beehive 132 entrance 134 when the applicator 118 may be disposed through the beehive 132 entrance 134 and retract the boom 114 to withdraw the applicator 118 from the entrance 134 of the beehive 132.

The movable frame 102 may include the following aspects. The movable frame 102 may be made of carbon fiber, plastic, steel, and aluminum, or other material suitable for the weight and strength requirements of the robotic system 100. The movable frame 102 may be constructed of light-weight material such that, the robotic system 100 fully configured weighs approximately to or less than 30 kilograms. The movable frame 102 further includes a cooling system for heat management during operation of the robotic system 100. Some embodiments include intaking air at the front of the robotic system 100 and venting hot air out of a top rear panel of the robotic system 100.

The movable frame 102 may further include a rollover protection structure 130 that protects the robotic system 100 from potential accidents where the movable frame 102 tips sideways or rolls over, exposing the fogger assembly 108, pump 110, boom 114, and fluid supply line 112 to damage. It should be appreciated that the location of the rollover protection structure 130 the movable frame 102, as shown in FIGS. 2 and 11*a*-11*b*, may provide for enhanced durability in outdoor environments and inclement weather. The rollover protection structure 130 may be made of similar material including carbon fiber, plastic, steel, and aluminum, or other material suitable for the strength requirements of supporting the robotic system 100 during rollovers. As shown in FIGS. 2 and 11*a*-11*b*, the rollover protection structure 130 may include a first side section 133 and second side section 135 coupled to the movable frame 102, with a top section 131 laterally positioned above the movable frame 102 wherein the first end 137 of the top section 131 may be coupled to the first side section 133, and the second end 139 of the top section 131 may be coupled to the second side section 135. The first side section 133, second side section 135, and top section 131 are positioned so that the top section 131 may be positioned higher than the fogger assembly 108, pump 110, boom 114, and fluid supply line 112.

The movable frame 102 may include a plurality of wheels 142 and a motor 150 configured to drive at least one wheel of the plurality of wheels 142. The plurality of wheels 142 may be configured to be in direct contact with the ground in order to propel and steer the movable frame 102 or may operate to drive one or more tracks to propel and steer the movable frame 102. The controller 128 may be in electrical communication with the motor 150 and configured to control the operation of the motor 150. In certain embodiments, the motor 150 may be configured to drive a plurality of the wheels 142. For example, in certain embodiments the motor 150 may be configured to drive four wheels 142 coupled to the movable frame 102 by a drivetrain. In another embodiment, the motor 150 may be configured to drive three wheels 142 coupled to the movable frame 102. Referring to FIG. 11*a*, the movable frame 102 may include a battery compartment 196. Referring to FIG. 6, in certain embodiments, the drivetrain may be powered by drive motor controllers 144. As shown in FIG. 11*b*, the movable frame 102 may include drive motors 198, disposed below the movable frame 102. In an additional embodiment, the movable frame 102 may also include a suspension system 146 for smooth navigation on undulating terrain. It should be appreciated that one skilled in the art can employ other configurations of mobility including alternative wheel placement, and wheel variations including crawler tracks, Mecanum wheels, and wheels 142 of a kind that may differ in name but not function. The movable frame 102 may employ any system of movement deemed appropriate by one skilled in the art.

The navigation system 104 may include the following aspects. The navigation system 104 may be configured to locate beehives 132 and further locate the entrance 134 to a beehive 132. The navigation system 104 may be configured to locate and navigate multiple beehives 132 in sequence, as shown in FIG. 5. The navigation system 104 may be configured to locate and navigate to a beehive 132 via the controller 128, locate and navigate the entrance 134 of the beehive 132, extend the boom 114 and applicator 118 via the controller 128 to the entrance 134 of the beehive 132 to allow for delivery of the health-based product 136, retract the boom 114 from the entrance 134 of the beehive 132 via the controller 128, and repeat the process as needed for subsequent beehives 132. The navigation system 104 may be configured to deliver health-based products 136 to a beehive 132 autonomously or be operated by an operator.

The navigation system 104 may include navigation sensors 161 as appropriately desired. The navigation system 104 may further be in electrical communication with the controller 128, so that based on information gathered by the navigation system 104, the controller 128 may control aspects of the navigation system 104. In particular, the navigation system 104 may include any appropriately desired hardware, software, and sensors 161 for detecting the location of the beehive 132. It should be appreciated that the navigation system 104 enhances the ability to deliver the health-based product 136 to the beehive 132 during inclement weather conditions and at night, allowing for flexible scheduling of the delivery operations.

As shown in FIG. 2, the product tank 106 may be configured to contain liquid, low volume fog, vapor, a spray, or a dry powder. The product tank 106 may be coupled to, or be a component of, the fogger assembly 108. The product tank 106 may be detachably coupled to the movable frame 102 to enhance cleaning accessibility and interchangeability. The product tank 106 may be disposed on the movable frame 102 within close proximity to the pump 110 and the boom 114. The product tank 106 may be in fluid communication with the pump 110, the applicator 118, and dispensing end 120 via the fluid supply line 112.

The robotic system 100 may include a fogger assembly 108 that may create a low volume fog, vapor, mist, spray, or a dry powder from a health-based product 136. The robotic system 100 may navigate between beehives 132 and autonomously deliver a predetermined or calculated dose of health-based product 136 from the fogger assembly 108 to each beehive 132. The fogger assembly 108 may be able generate an adequate amount of health-based product 136 fog to fog a beehive 132 in two minutes or less. The fogger assembly 108 may be detachably coupled to the movable frame 102 to enhance cleaning accessibility and interchangeability. The fogger assembly 108 may be configured to meet or exceed the performance of commercially available cold foggers.

With reference to FIGS. 2 and 7-8, the fogger assembly 108 may include an ultrasonic fogger 172, exciting acoustic waves and splitting liquid into particles. It should be appreciated that embodiments that include an ultrasonic fogger 172 provide the advantage of efficiently generating fog of a lower particle size, allowing for enhanced disbursement. The fogger assembly 108 may be in proximity to and filled to a desired level by a peristaltic pump 105. The fogger assembly 108 may be in fluid communication with the fluid supply line 112. The fogger assembly 108 may be in fluid communication with both the fluid supply line 112 and the pump 110. As shown in FIG. 7, the fogger assembly 108 may also include a fluid level sensor 168 for detecting the fluid level of the health-based product 136.

With reference to FIGS. 1 and 7-8, the fogger assembly 108 may be an ultrasonic fogger 172 that includes a chamber 158 between 3-20 liters in size. The chamber 158 may include a sloped bottom 159 to direct wall condensation back to the fogger assembly 108. The chamber 158 may also include a lid 163 that, when closed via a twist locking tab 174, may be sealed with an O-ring 176 to reduce fog leakage. The fogger assembly 108 may also include a plurality of fogger heads 166. The chamber 158 may further include chamber walls 164, and may further include a top plate 162, and fluid supply line fitting 160. The chamber walls 164 may be made of polyethylene. Embodiments may include a fill port 170. A mounting plate 178 may be used to dispose the fogger assembly 108 and the pump 110 to the movable frame 102.

As shown in FIGS. 7-8, the fogger assembly 108 may include an output port 192, which may be approximately 10-40 millimeters in size. The fogger assembly 108 may include a chamber 158 that has a chamber diameter 194 of approximately 200-300 millimeters. According to certain embodiments, the total internal volume of the chamber 158 may be approximately 5-10 liters. It should be appreciated that a chamber 158 between 3-20 liters in size allows for an optimized fan 148 air delivery rate and output port 192 size.

With reference to FIGS. 7-8, the fogger assembly 108 may include a fan 148 disposed on the product tank 106, where the fan 148 forces fog out of the fogger assembly 108 and into the fluid supply line 112 through a fan duct 156. The fan duct 156 may be coupled to the fogger assembly 108 through a fan input port 190. The fan input port 190 may be approximately 50-70 millimeters in diameter. The fan 148 may be of equal or smaller size to the fogger assembly 108. Alternatively, a plurality of fans 148 may be used. It should be appreciated that the fan 148, as shown in FIGS. 7-8, provides for ease of integration due to the relative size of the fan 148 to the fogger assembly 108 and a low power consumption.

With reference to FIG. 1, the fogger assembly 108 may include a plurality of jet nebulizers 111 that spray pressurized water allowing small particles to be dispensed, and large particles condense on the sides of the product tank 106 to be recycled. The fogger assembly 108 may include the use of a plurality of jet nebulizers 111 in combination with a peristaltic pump 105. It should be appreciated that when the fogger assembly 108 includes a plurality of jet nebulizers 111, they may have a positive impact on bacteriophage survivability due the ability to create larger particle sizes, leading to lower phage degradation, when the health-based product 136 includes the bacteriophage. The fogger assembly 108 may also include a swirl injector 113. Certain embodiments may include the use of a swirl injector 113 in combination with a peristaltic pump 105. The fogger assembly 108 may include the use of a vacuum motor 123 configured to direct air to the end of the nozzle 122.

The pump 110 may include the following aspects. The robotic system 100 can include a pump 110 that is in fluid communication with the fluid supply line 112 and the product tank 106, where the pump 110 is in electronic communication with the controller 128. As shown in FIGS. 1 and 9*a*-9*b*, the pump 110 may be in proximity to the fogger assembly 108 and in fluid communication with the fogger assembly 108 and product tank 106. The pump 110 may be disposed on the top portion of the movable frame 102. The pump 110 may be disposed below the movable frame 102 to shield the pump 110 from weather elements, and debris. The pump 110 may include a pump motor 180 and a motor shaft 188. The pump 110 may also include a pump output 182 and pump intake 186 that may be in fluid communication with the fluid supply line 112. The pump 110 may also include a vibration damping pad 184. It should be appreciated that use of a peristaltic pump 105 may enhance the viability of bacteriophage containing health-based products 136 due to fact that the peristaltic pump 105 does use blades or other mechanical parts to move the health-based product 136 through the pump 110, thereby avoiding exposure of the health-based product 136 to high shear forces. With reference to FIG. 2, and 11*a*-11*b*, the fluid supply line 112 may be mounted to the boom 114. Alternatively, the fluid supply line 112 may be mounted to the boom 114 and wrist 126.

The boom 114 may include the following aspects. As shown in FIG. 1, the boom 114 may include a telescopic boom 115. The telescopic boom 115 may include a plurality of drawer slides 119 configured to extend and retract a portion of the telescopic boom 115. The telescopic boom 115 may be driven by a leadscrew with a cascading second stage configured to extend and retract. The boom 114 may include a crank slider boom 117. Embodiments may include a combination or variation of the telescopic boom 115 and crank slider boom 117. The crank slider boom 117 may be driven by a brushed DC motor 121.

Embodiments that include a crank slider boom 117 may also include a shoulder actuator 152 for the arm 124. The shoulder actuator 152 may be disposed on the boom 114 and pivotally coupled to the arm 124. The shoulder actuator 152 may be pivotally coupled to the boom 114 and pivotally coupled to the arm 124. The shoulder actuator 152 may be pivotally coupled to the boom 114 and pivotally coupled to a turret 116. The boom 114 may be powered by a low-speed motor 153. As shown in FIGS. 1, 2, and 11*a*-11*b*, the boom 114 may also include an arm 124, rotatably coupled to the boom 114.

It should be appreciated that embodiments of the robotic system 100 that include a boom 114 provide the additional freedom and range of motion for reaching the beehive 132 entrances 134 at different elevations from the ground and different distances from the movable frame 102. This enhanced range of motion is not found in other devices, including embodiments described by U.S. patent application Ser. No. 18/411,865, titled AUTOMATED SYSTEM AND METHOD FOR APPLICATION OF A BEEHIVE TREATMENT. For example, an embodiment that uses an arm 124, without a boom 114 to extend and retract, may have difficulty positioning the robotic system 100 adjacent to a beehive 132 without scraping the dispensing end 120 across the face of the beehive 132 due to the restricted motion of the arm 124. By contrast, an embodiment that includes a boom 114 provides improvements in extending and retracting motions, increasing the horizontal linear durability of robotic system 100. Use of a boom 114 also improves repeatability of positioning the robotic system 100 adjacent to the beehive 132 and reduces the risk of debris interfering with the movement of the boom 114 and the applicator 118. Additionally, the extendibility and retractability of the boom 114 improves the ability of the robotic system 100 to position itself at a farther distance from the beehive 132. This allows the robotic system 100 to move and operate around obstacles such as overgrowth, tall grass, rocks, gravel, and mud that would otherwise hinder the robotic system's 100 proximity to the beehive 132.

With reference to FIGS. 1-2 and 11*b*, the robotic system 100 may include a turret 116 disposed on the movable frame 102. The turret 116 may be coupled the movable frame 102 and configured to rotate on a lateral plane. The turret 116 may be coupled to the movable frame 102 and coupled to the boom 114 and configured to rotate the boom 114 horizontally. The turret 116 may be made of carbon fiber, plastic, steel, and aluminum, or other material suitable for the weight and strength requirements of bearing the weight of the boom 114, applicator 118, fluid supply line 112, and other components. The turret 116 may also use a low-speed motor 153. It should be appreciated that an embodiment that includes an aluminum turret 116 provides enhanced resistance to radial torque loads. Additionally, embodiments that include the use of a turret 116 allow for increased range of motion and orientation for operations that would otherwise require the robotic system 100 to perform difficult turns.

With reference to FIGS. 1 and 4*a*-4*b*, a dispensing end 120 of the applicator 118 may be placed at the entrance 134 of the beehive 132 or placed through the entrance 134 and fully within an interior 138 of the beehive 132 when delivering the health-based product 136 to the interior 138 of the beehive 132. A nozzle 122 may be coupled to the dispensing end 120 of the applicator 118. In particular, the nozzle 122 may be configured for delivering the health-based product 136 to an interior 138 of the beehive 132. The product tank 106 may be in fluid communication with the nozzle 122 of the applicator 118 through a fluid supply line 112. In certain embodiments, the controller 128 may be configured to control the operation of the pump 110 to deliver the health-based product 136 via the nozzle 122. The nozzle 122 may include an ultra-low volume cold fogger 143. The nozzle 122 may be moldable in order to accommodate different beehive 132 entrance 134 shapes.

As shown in FIG. 1, and 10*a*-10*c*, the nozzle 122 may include a fan-shaped mouth 147. As shown in FIG. 10*b*, the nozzle 122 may be approximately 70-100 millimeters in length, 4-10 millimeters in width at the end 145 coupled to the applicator 118, approximately 20-30 millimeters in height at the fan-shaped mouth 147 end of the nozzle 122 taper, and approximately 30-50 millimeters in width at the fan-shaped mouth 147 of the nozzle 122, to create fan-shaped profile on the end of the nozzle 122. As shown in FIGS. 10*a*-10*c* and 11*a*-11*b*, the fan-shaped mouth 147 may be fitted to the end of the fluid supply line 112. It should be appreciated that one skilled in the art may employ various configurations of the dispensing end 120 to accommodate various beehive 132 entrances 134, as designed.

As shown in FIG. 1, the nozzle 122 may include an internal mixing atomizing nozzle 149, in which compressed air may be used to accelerate the health-based product 136 resulting in the health-based product 136 separating into a fine mist or fog. The internal mixing atomizing nozzle 149 may include a needle valve 151 that may be used to tune the amount of health-based product 136 being dispensed. It should be appreciated that embodiments which include an internal mixing atomizing nozzle 149, and a needle valve 151 provide flexibility in fluid supply line 112 size and the ability to finely adjust the amount of health-based product 136 emitted at a low cost.

With reference to FIGS. 1-2 and 11*a*-11*b*, the robotic device 100 may include an arm 124 rotatably coupled to a boom 114. The arm 124 may be made of carbon fiber, plastic, steel, and aluminum, or other material suitable for the weight and strength requirements of reaching an entrance 134 of a beehive 132 and delivering a health-based product 136. The arm 124 may be rotatably coupled to the boom 114 and coupled to the applicator 118. The boom 114 may include a shoulder actuator 152 disposed on the boom 114, wherein the shoulder actuator 152 may be pivotally coupled to the arm 124. The fluid supply line 112 may also be coupled to the arm 124 for stabilizing the fluid supply line 112. The combination of the arm 124 with the boom 114 includes the ability to reach the beehive 132 entrance 134 at different distances from the movable frame 102 and different elevations off the ground, where the arm 124 provides enhanced height adjustment.

Referencing FIGS. 1-2 and 12*a*, the robotic system 100 may include a wrist 126. The wrist 126 may be rotatably coupled to the arm 124 and coupled to the applicator 118. The boom 114 may include a shoulder actuator 152 pivotally coupled with the arm 124, where the arm 124 may be coupled to a servo motor 141. The servo motor 141 may be configured to operate as a wrist 126 that positions the dispensing end 120 at the entrance 134 of a beehive 132.

With reference to FIGS. 1, 3*a* and 3*b*, a controller 128 may be in communication with the movable frame 102, the navigation system 104, fogger assembly 108, and pump 110. The controller 128 may be configured to move the movable frame 102 to a position adjacent the beehive 132, detect the entrance 134 of the beehive 132 with the navigation system 104, and move the boom 114 to dispose the applicator 118 to an entrance 134 to the beehive 132. The controller 128 may be configured to adjust a position of the boom 114 to move the arm 124 to dispose the applicator 118 with the entrance 134 to the beehive 132. The controller 128 may also be configured to move a turret 116 to move, rotate, change elevation, and position the boom 114. The controller 128 may include an electronic device 154 in remote communication with the controller 128 and the navigation system 104, the fogger assembly 108 and the pump 110. For example, the controller 128 may include a REV Control Hub 129 that integrates the processing and communication for the robotic system 100. In order to provide for remote operations, the electronic device 154 may include a wireless transmitter 125, a wireless receiver 127, or combination and may be in communication with the controller 128, the movable frame 102, the navigation system 104, the fogger assembly 108, and the pump 110 for remotely controlling the robotic system 100.

The health-based product 136 may include a include a honeybee pest product, a honeybee predator control product, a honeybee parasite control product, a honeybee disease control product, or a phage-based pesticide. The phage-based pesticide may include one or more bacteriophages, and may further include lytic phages, temperate phages, or any combinations thereof. The health-based product 136 may also contain bacteriophages that disrupt varroa mites, Tracheal mites, Tropilaelaps mites, and any other species of mites that are affected by bacteriophages. The health-based product 136 may be configured as one or more of a low volume fog, a vapor, a spray, and a dry powder. However, as would be apparent to someone of ordinary skill in the art, the health-based product 136 may include any appropriately desired and combination of health-based products 136.

In the context of the robotic system 100 and related methods provided herein, it should be understood that the following relationships apply to present disclosure.

The term "movable frame" may include a movable platform or a mobile frame. This list is not intended to be exhaustive or to distinguish between structures that differ in name but not function.

The term "fog" may include low volume fog, vapor, mist, spray, or a dry powder, or substances of similar physical properties. This list is not intended to be exhaustive or to distinguish between physical properties that differ in name but not function.

The term "applicator" may include a flexible applicator, rigid applicator, or moldable applicator. This list is not intended to be exhaustive or to distinguish between applicators that differ in name but not function.

The term "dispensing end" may include an effector. This list is not intended to be exhaustive or to distinguish between applicator ends that differ in name but not function.

The term "boom" may include an extending boom. This list is not intended to be exhaustive or to distinguish between boom structures that differ in name but not function.

In the context of delivering a health-based product 136 to a beehive 132, to "control delivery" may include atomizing, spraying, metering, fogging, pressurizing, dispensing, or any combination thereof. This list is not intended to be exhaustive or distinguish between types or methods of delivery that differ in name but not function.

Advantageously, the present disclosure addresses shortcomings in the beekeeping industry by providing a robotic system 100 and methods for automating the delivery of health-based products 136 to beehives 132 that enhances the efficiency and scalability of commercial beekeeping. The present technology reduces the need for manual application of health-based products 136, decreasing the costs of labor and overall cost of crop production. Automating the delivery of health-based products 136 to beehives 132 cuts down the time needed to treat honeybees 140 in large commercial beekeeping operations, lending to more efficient coordination with the agricultural industry. Additionally, automating health-based products 136 to commercial beehives 132 is beneficial due to the repetitive and predictable nature of the task, and the scale at which treatments need to be dispensed. The robotic system 100 provides a comprehensive solution that addresses the needs of commercial beekeepers, agricultural clients, and customers by providing a cost-effective, labor-saving, and energy-efficient option that overcomes the limitations of current pesticide applications in the beekeeping industry.

EXAMPLES

Example embodiments and methods of the present technology are provided with reference to the several figures enclosed herewith.

FIG. 12*a* is a flowchart that describes a method 200 of using a robotic system 100 for navigating to a beehive 132 and delivering the health-based product 136 through the entrance 134 of the beehive 132. In step 202, a movable frame 102 may be provided. In step 204, a navigation system 104 may also be provided, where the navigation system 104 may be disposed on the movable frame 102 and may be configured to detect the location of the beehive 132. A product tank 106 may be provided and may configured to hold the health-based product 136. The product tank 106 may be further configured to be disposed on the movable frame 102. A boom 114 may be provided and may be disposed on the movable frame 102. The boom 114 may be configured to extend and retract relative to the movable frame 102. In step 206, an applicator 118 may also be provided, wherein the applicator 118 may be coupled to the boom 114. The applicator 118 may further include a dispensing end 120. The applicator 118 may also be in fluid communication with the product tank 106. In step 208, controller 128 may be provided. The controller 128 may be in communication with the movable frame 102, the navigation system 104, the applicator 118 and the boom 114. In step 210, the controller 128 may be used to position the movable frame 102 adjacent the beehive 132. The location of the beehive 132 and the entrance 134 of the beehive 132 may be detected with the navigation system 104. Then, in step 212, the boom 114 may be extended to dispose the applicator 118 through the entrance 134 of the beehive 132. In step 214, the health-based product 136 may be delivered through the entrance 134 of the beehive 132 and in step 216, the controller 128 may be configured to retract the boom 114 to withdraw the applicator 118 from the beehive 132 entrance 134. Steps 210, 212, 214, and 216 may be repeated for additional beehives 132.

FIG. 12*b* is a flowchart that describes another method 300 of using a robotic system 100 for navigating to a beehive 132 and delivering the health-based product 136 through the entrance 134 of the beehive 132. In step 302, a movable frame 102 may be provided. In step 304, a navigation system 104 may also be provided, where the navigation system 104 may be disposed on the movable frame 102 and may be configured to detect the location of the beehive 132. A product tank 106 may be provided and may configured to hold the health-based product 136. The product tank 106 may be further configured to be disposed on the movable frame 102. A fogger assembly 108 may be provided. The fogger assembly 108 may be disposed on the movable frame 102 and may be in fluid communication with the product tank 106. In step 306, an applicator 118 may also be provided, wherein the applicator 118 may further include a dispensing end 120. The applicator 118 may also be in fluid communication with the product tank 106 and the fogger assembly 108. In step 308, controller 128 may be provided. The controller 128 may be in communication with the movable frame 102, the navigation system 104, the fogger assembly 108, and the applicator 118. In step 310, the controller 128 may be used to position the movable frame 102 adjacent the beehive 132. The location of the beehive 132 and the entrance 134 of the beehive 132 may be detected with the navigation system 104. In step 312, the controller 128 may be configured to dispose the applicator 118 to the beehive 132 entrance 134. In step 314, the controller 128 may be further configured to dispose the dispensing end 120 of the applicator 118 through the beehive 132 entrance 134. In step 316, the fogger assembly 108 may be activated, and in step 318, the health-based product 136 may be delivered from the fogger assembly 108 through the entrance 134 of the beehive 132. Steps 310, 312, 314, 316, and 318 may be repeated for additional beehives 132.

FIG. 12*c* is a flowchart that describes yet another method 400 of using a robotic system 100 for navigating to a beehive 132 and delivering the health-based product 136 through the entrance 134 of the beehive 132. In step 402, a movable frame 102 may be provided. In step 404, a navigation system 104 may also be provided, where the navigation system 104 may be disposed on the movable frame 102 and may be configured to detect the location of the beehive 132. A product tank 106 may be provided and may configured to hold the health-based product 136. The product tank 106 may be further configured to be disposed on the movable frame 102. A fogger assembly 108 may be provided. The fogger assembly 108 may be disposed on the movable frame 102 and may be in fluid communication with the product tank 106. A boom 114 may be provided and may be disposed on the movable frame 102. The boom 114 may be configured to extend and retract relative to the movable frame 102. In step 406, an applicator 118 may also be provided, wherein the applicator 118 may be coupled to the boom 114. The applicator 118 may further include a dispensing end 120. The applicator 118 may also be in fluid communication with the product tank 106 and the fogger assembly 108. A nozzle 122 may be provided, wherein the nozzle 122 may be coupled to the dispensing end 120 of the applicator 118 and in fluid communication with the applicator 118 and the dispensing end 120. In step 408, a turret 116 may be provided, wherein the turret 116 may be coupled to the boom 114. An arm 124 may be provided, wherein the arm 124 may also be rotatably coupled to the boom 114 and coupled to the applicator 118. A wrist 126 may also be provided, wherein the wrist 126 may be ratably coupled to the arm 124 and coupled to the applicator 118. In step 410, a pump 110 may be provided, wherein the pump 110 may be in fluid communication with a fluid supply line 112, the fogger assembly

108, and the applicator 118. In step 412, controller 128 may be provided. The controller 128 may be in communication with the movable frame 102, the navigation system 104, the fogger assembly 108, the applicator 118, the turret 116, the boom 114 and the pump 110. In step 414, the controller 128 may be used to position the movable frame 102 adjacent the beehive 132. The location of the beehive 132 and the entrance 134 of the beehive 132 may be detected with the navigation system 104. Then, in step 416, the boom 114 may be extended to dispose the applicator 118 through the entrance 134 of the beehive 132. In step 418, the fogger assembly 108 may be activated, and in step 420, the health-based product 136 may be delivered from the fogger assembly 108 through the entrance 134 of the beehive 132. Steps 414, 416, 418, and 420 may be repeated for additional beehives 132.

Example embodiments and methods are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods may be made within the scope of the present technology, with substantially similar results.

What is claimed is:

1. A robotic system for delivery of a health-based product to a beehive entrance, comprising:
- a movable frame;
- a navigation system disposed on the movable frame and configured to determine a location of the beehive entrance;
- a product tank disposed on the movable frame, the product tank configured to hold the health-based product;
- a boom disposed on the movable frame, the boom configured to extend and retract relative to the movable frame;
- an applicator coupled to the boom, the applicator including a dispensing end, the applicator in fluid communication with the product tank; and
- a controller in communication with the movable frame, the navigation system, the boom, and the applicator, the controller configured to:
  - position the movable frame adjacent the beehive entrance,
  - extend the boom to dispose the dispensing end of the applicator through the beehive entrance,
  - deliver the health-based product through the beehive entrance when the applicator is disposed through the beehive entrance, and
  - retract the boom to withdraw the applicator from the beehive entrance.

2. The robotic system of claim 1, wherein the boom includes a member selected from a group consisting of a telescopic boom, a crank slider boom, and combinations thereof.

3. The robotic system of claim 1, further comprising a turret in communication with the controller and the boom, wherein the controller is configured to move the turret to position the boom.

4. The robotic system of claim 1, wherein the applicator includes a nozzle coupled to the dispensing end of the applicator, the nozzle configured to control delivery of the health-based product through the beehive entrance when the applicator is disposed through the entrance of the beehive.

5. The robotic system of claim 1, wherein the boom includes an arm, the arm rotatably coupled to the boom and coupled to the applicator.

6. The robotic system of claim 5, wherein the boom includes a shoulder actuator disposed on the boom and pivotally coupled to the arm.

7. The robotic system of claim 5, wherein the boom includes a wrist, the wrist rotatably coupled to the arm and coupled to the applicator.

8. A method of delivering a health-based product to a beehive entrance, the method comprising:
- providing a robotic system according to claim 1;
- positioning the movable frame adjacent the beehive entrance;
- extending the boom to dispose the applicator through the beehive entrance; and
- delivering the health-based product through the beehive entrance when the applicator is disposed through the beehive entrance.

9. A robotic system for delivery of a health-based product to a beehive entrance, comprising:
- a movable frame;
- a navigation system disposed on the movable frame and configured to determine a location of the beehive entrance;
- a product tank disposed on the movable frame, the product tank configured to hold the health-based product;
- an applicator including a dispensing end, the applicator being in fluid communication with the product tank;
- a fogger assembly disposed on the movable frame, the fogger assembly in fluid communication with the product tank and the applicator; and
- a controller in communication with the movable frame, the navigation system, the applicator, and the fogger assembly, the controller configured to:
  - position the movable frame adjacent the beehive entrance,
  - dispose the applicator to the beehive entrance,
  - dispose the dispensing end of the applicator through the beehive entrance,
  - activate the fogger assembly, and
  - deliver the health-based product from the fogger assembly through the beehive entrance when the applicator is disposed through the beehive entrance.

10. The robotic system of claim 9, wherein the fogger assembly includes an ultrasonic fogger.

11. The robotic system of claim 9, wherein the fogger assembly includes a pump in fluid communication with the product tank and a supply line, the pump in electrical communication with the controller, the controller configured to control an operation of the pump to deliver the health-based product via the supply line to the applicator.

12. The robotic system of claim 11, wherein the pump includes a peristaltic pump.

13. The robotic system of claim 9, wherein the fogger assembly includes a fluid level sensor and the controller is in communication with the fluid level sensor.

14. The robotic system of claim 9, wherein the fogger assembly includes a member selected from a group consisting of an ultrasonic fogger, a jet nebulizer, and a swirl-injector fogger.

15. The robotic system of claim 9, wherein the applicator includes a member selected from a group consisting of an internal mixing atomizing nozzle and a ultra-low volume cold fogger.

16. The robotic system of claim 9, wherein the controller includes an electronic device configured to actuate a motor, position the movable frame to the position adjacent the beehive, operate the navigation system to detect the entrance of the beehive, and move the arm to dispose the applicator to the entrance to the beehive autonomously.

17. The robotic system of claim 9, wherein the movable frame includes a rollover protection structure disposed on the movable frame configured to protect the robotic system and its components.

18. A method of delivering a health-based product to a beehive entrance, the method comprising:
- providing a robotic system according to claim 9;
- positioning the movable frame adjacent the beehive entrance;
- disposing the applicator to the beehive entrance;
- disposing the dispensing end of the applicator through the beehive entrance;
- activating the fogger assembly; and
- delivering the health-based product from the fogger assembly through the beehive entrance.

19. A robotic system for delivery of a health-based product to a beehive entrance, comprising:
- a movable frame;
- a navigation system disposed on the movable frame and configured to detect a location of the beehive;
- a product tank disposed on the movable frame, the product tank configured to hold the health-based product;
- a fogger assembly disposed on the movable frame, the fogger assembly in fluid communication with the product tank;
- a boom disposed on the movable frame, the boom configured to extend and retract relative to the movable frame;
- an applicator coupled to the boom, the applicator including a dispensing end, the applicator in fluid communication with the product tank and the fogger assembly;
- a nozzle coupled to the dispensing end of the applicator;
- a turret in coupled to movable frame and rotatably coupled to the boom;
- an arm, the arm rotatably coupled to the boom and coupled to the applicator;
- a wrist, the wrist rotatably coupled to the arm and coupled to the applicator;
- a pump in fluid communication with a fluid supply line, the fogger assembly, and the applicator; and
- a controller in communication with the movable frame, the navigation system, the fogger assembly, the applicator, the turret, the boom, and the pump, and the controller configured to:
  - position the movable frame adjacent the beehive entrance,
  - extend the boom to dispose the dispensing end of the applicator through the beehive entrance,
  - activate the fogger assembly,
  - control the operation of the pump, and
  - deliver the health-based product from the fogger assembly through the beehive entrance when the applicator is disposed through the beehive entrance.

20. A method of delivering a health-based product to a beehive entrance, the method comprising:
- providing a robotic system according to claim 19;
- positioning the movable frame adjacent the beehive entrance;
- extending the boom to dispose the applicator through the beehive entrance;
- activating the fogger assembly; and
- delivering the health-based product from the fogger assembly through the beehive entrance when the applicator is disposed through the beehive entrance.

* * * * *